(12) United States Patent
Chen

(10) Patent No.: US 8,292,305 B2
(45) Date of Patent: Oct. 23, 2012

(54) ADJUSTABLE MAGNETISM SHELTER OF A CUTTER HOLDER

(76) Inventor: Chin-Chiu Chen, Taichung Hsien (TW)

(*) Notice: Subject to any disclaimer, the term of this patent is extended or adjusted under 35 U.S.C. 154(b) by 717 days.

(21) Appl. No.: 12/535,196

(22) Filed: Aug. 4, 2009

(65) Prior Publication Data

US 2011/0031707 A1 Feb. 10, 2011

(51) Int. Cl.
*B23B 31/163* (2006.01)
(52) U.S. Cl. ........................ 279/114; 279/128; 279/152
(58) Field of Classification Search .................. 279/114, 279/152, 128, 110
See application file for complete search history.

(56) References Cited

U.S. PATENT DOCUMENTS

| | | | | | |
|---|---|---|---|---|---|
| 877,773 | A | * | 1/1908 | Holm | 81/128 |
| 2,264,589 | A | * | 12/1941 | Rydquist | 279/2.2 |
| 3,656,773 | A | * | 4/1972 | Blattry et al. | 279/121 |
| 4,398,733 | A | * | 8/1983 | Mosley, Jr. | 279/127 |
| 4,548,417 | A | * | 10/1985 | Glommen | 279/5 |
| 4,663,999 | A | * | 5/1987 | Colvin | 81/128 |
| 5,076,121 | A | * | 12/1991 | Fosella | 81/58.4 |
| 5,141,239 | A | * | 8/1992 | Clay | 279/114 |
| 5,143,686 | A | * | 9/1992 | Shimizu | 279/110 |
| 5,183,272 | A | * | 2/1993 | Tyvela | 279/156 |
| 5,305,670 | A | * | 4/1994 | Fossella et al. | 81/63.2 |
| 5,338,045 | A | * | 8/1994 | Yang | 279/128 |
| 5,375,309 | A | * | 12/1994 | Dunn | 29/237 |
| 5,448,931 | A | * | 9/1995 | Fossella et al. | 81/63.2 |
| 5,594,981 | A | * | 1/1997 | Piontek et al. | 29/235 |
| 5,735,534 | A | * | 4/1998 | Edwards | 279/124 |
| 5,785,325 | A | * | 7/1998 | Daetwyler | 279/33 |
| 5,819,607 | A | * | 10/1998 | Carnesi | 81/128 |
| 5,996,446 | A | * | 12/1999 | Lee | 81/128 |
| 6,073,522 | A | * | 6/2000 | Carnesi | 81/128 |
| 6,220,608 | B1 | * | 4/2001 | Varnau | 279/114 |
| 6,568,694 | B1 | * | 5/2003 | White | 279/133 |
| 6,913,429 | B1 | * | 7/2005 | Phillips et al. | 409/182 |
| 7,226,055 | B1 | * | 6/2007 | Bettencourt et al. | 279/106 |
| 7,516,964 | B2 | * | 4/2009 | Ubele et al. | 279/124 |
| 2001/0048204 | A1 | * | 12/2001 | Sida | 279/124 |
| 2004/0051259 | A1 | * | 3/2004 | Belik | 279/152 |

* cited by examiner

*Primary Examiner* — Eric A Gates
*Assistant Examiner* — Bayan Salone
(74) *Attorney, Agent, or Firm* — Muncy, Geissler, Olds & Lowe, PLLC

(57) ABSTRACT

An adjusting magnetism shelter of a cutter holder has a stationary collar, a sliding assembly and a cap. The stationary collar has a disk and multiple sliding recesses. A first hole is defined in the disk. The sliding recesses are defined in the disk. The sliding assembly has multiple sliding bars. Each sliding bar is mounted in a sliding recess and has a magnetism bar and a moving shaft. The magnetism bar has a reflection surface. The moving shaft protrudes from each sliding bar. The cap covers the stationary collar and has a top board. The top board has multiple arc grooves. Each arc groove has an inner end and an outer end. The inner end of the arc groove is near the first hole. The outer end of the arc groove is far away from the first hole and is inserted into one of the moving shafts.

8 Claims, 9 Drawing Sheets

ADJUSTABLE MAGNETISM SHELTER OF A CUTTER HOLDER

BACKGROUND OF THE INVENTION

1. Field of the Invention

The present invention relates to a magnetism shelter, and more particularly to an adjustable magnetism shelter for a cutter holder.

2. Description of Related Art

A heating device of a cutter holder has a coil for transferring a magnetic line of force to a thermal energy to increase temperature of the cutter holder. Increasing a temperature of the cutter holder causes an insert hole of the cutter holder to gradually expand and allow a cutter tool to be inserted into the insert hole. Reducing a temperature of the cutter holder closes and securely holds a tool in the insert hole of the cutter holder.

In order to focus the magnetic line of force focus on the cutter holder, a magnetism shelter is mounted above the heating device and is mounted around the cutter holder. The magnetism shelter can reflect the magnetic line of forces to the cutter holder to enhance a thermal energy transformation.

However, a conventional magnetism shelter is not adjusted according to a size of the cutter tool, so cannot match various types of cutter tools, and thus the magnetic line of force cannot be completely focused on various types of cutter holders.

To overcome the shortcomings, the present invention tends to provide an adjustable magnetism shelter of a cutter holder to mitigate or obviate the aforementioned problems.

SUMMARY OF THE INVENTION

An adjusting magnetism shelter of a cutter holder has a stationary collar, a sliding assembly and a cap. The stationary collar has a disk, a first hole and multiple sliding recesses. The first hole is defined through the disk. The sliding recesses are defined radially in the disk. The sliding assembly has multiple sliding bars. Each sliding bar is mounted slidably in a sliding recess and has a magnetism bar and a moving shaft. The magnetism bar has a reflection surface. The moving shaft protrudes from each the sliding bar. The cap covers the stationary collar and has a top board. The top board has multiple arc grooves. Each arc groove has an inner end and an outer end. The inner end of the arc groove is near the first hole. The outer end of the arc groove is far away from the first hole and is inserted into one of the moving shafts of the sliding assembly. Because the magnetism shelter can be adjusted to match with various types of cutter tools, the magnetism bars completely shelter and reflect magnetic lines of force of a heating device to enhance an efficiency of a thermal energy transformation.

Other objects, advantages and novel features of the invention will become more apparent from the following detailed description when taken in conjunction with the accompanying drawings.

DETAILED DESCRIPTION OF PREFERRED EMBODIMENT

Figure 1:
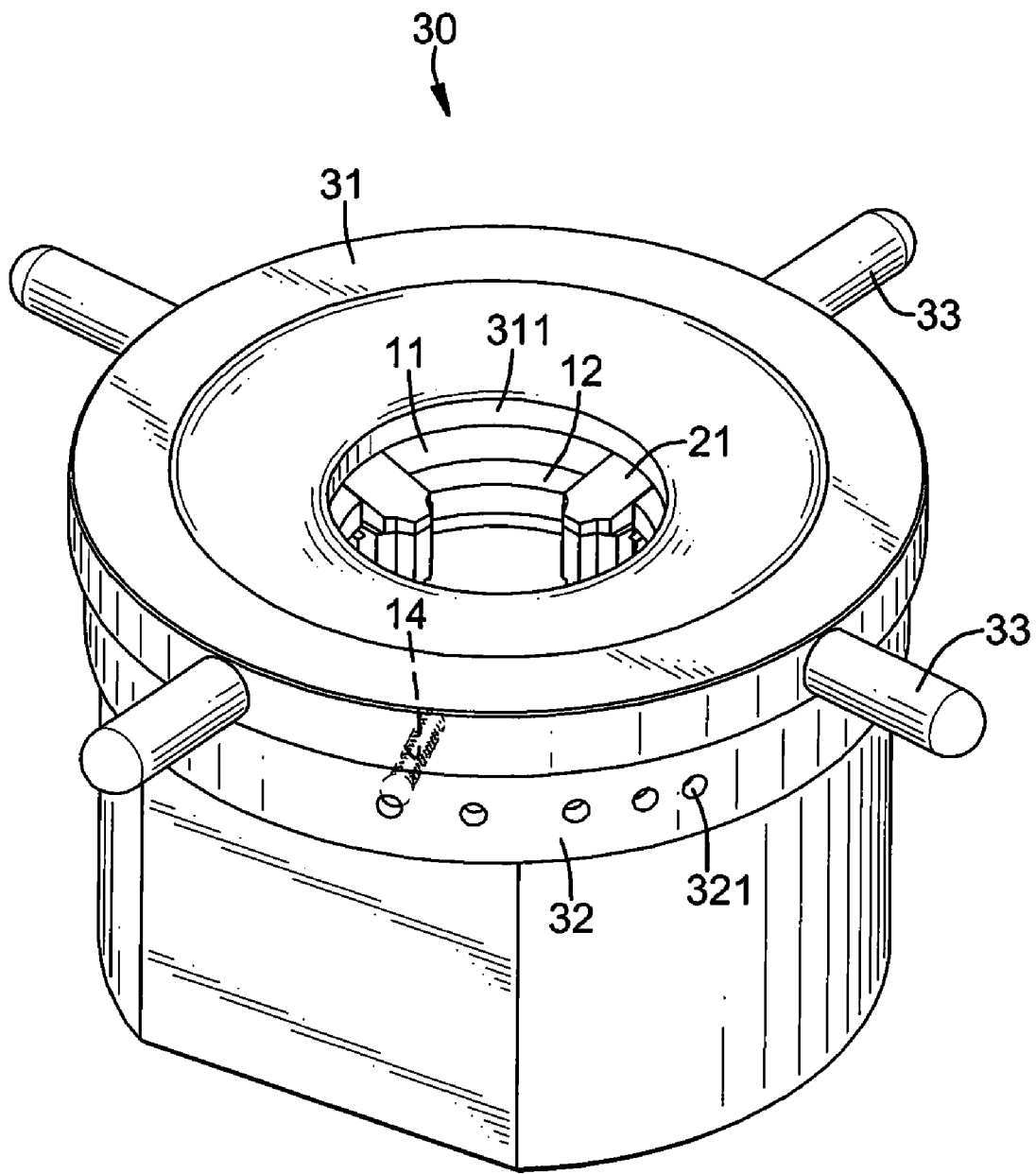
FIG. 1 is a perspective view of an adjustable magnetism shelter of a cutter holder in accordance with the present invention.
Figure 2:
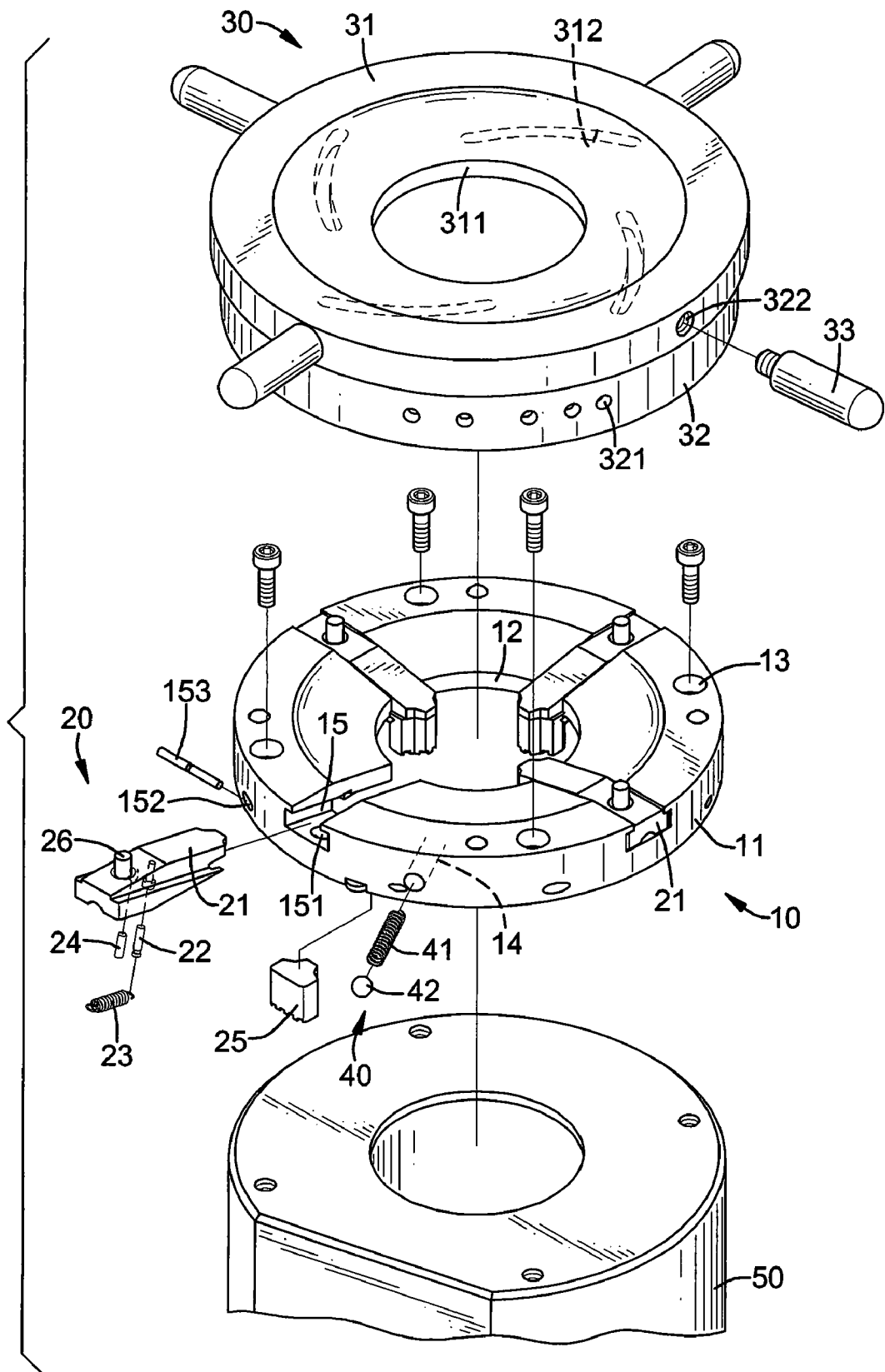
FIG. 2 is an exploded perspective view of the adjustable magnetism shelter of the cutter holder in FIG. 1.
Figure 3:
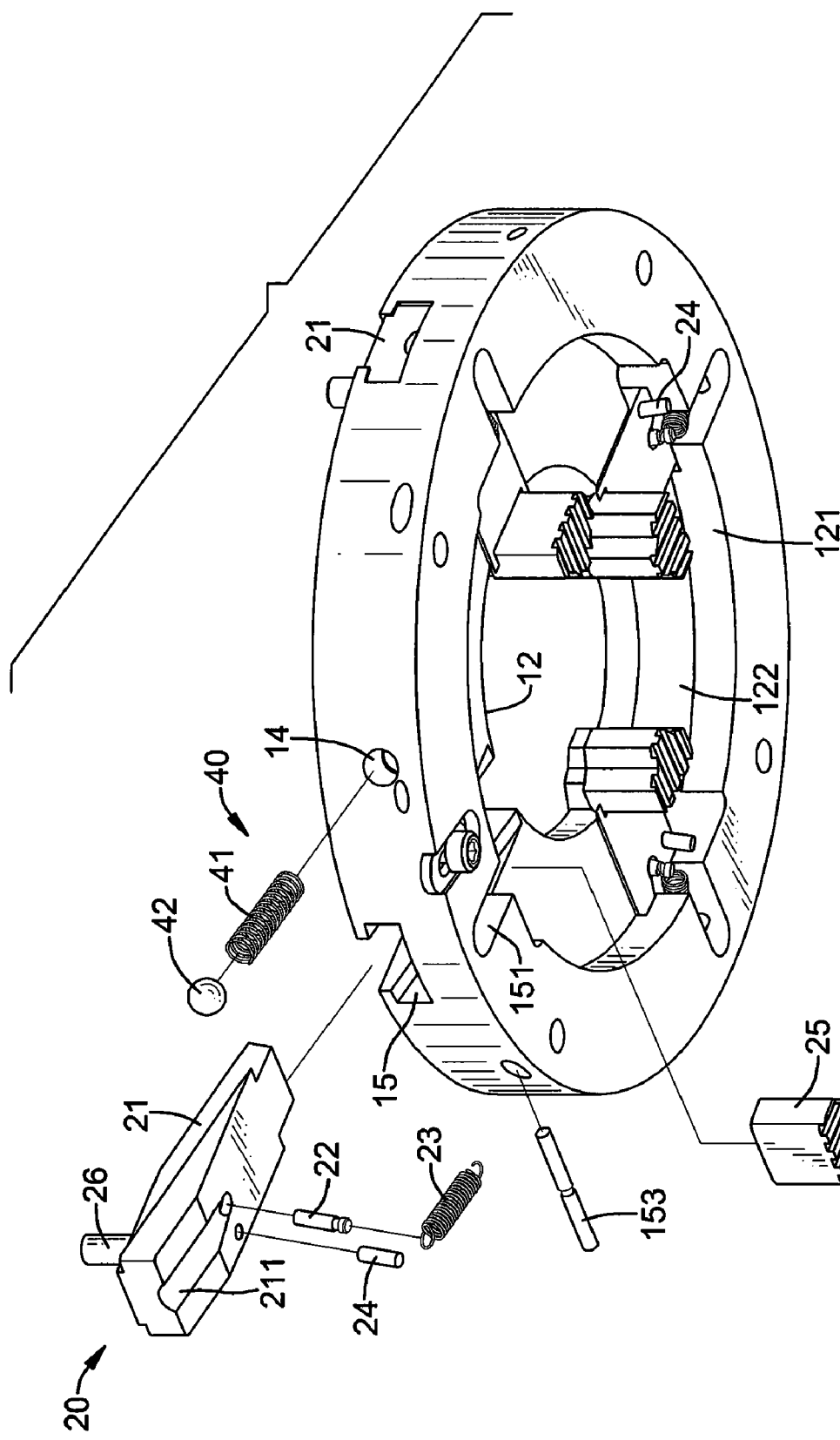
FIG. 3 is an enlarged partially exploded perspective view of the adjustable magnetism shelter of the cutter holder in FIG. 1.
Figure 4:
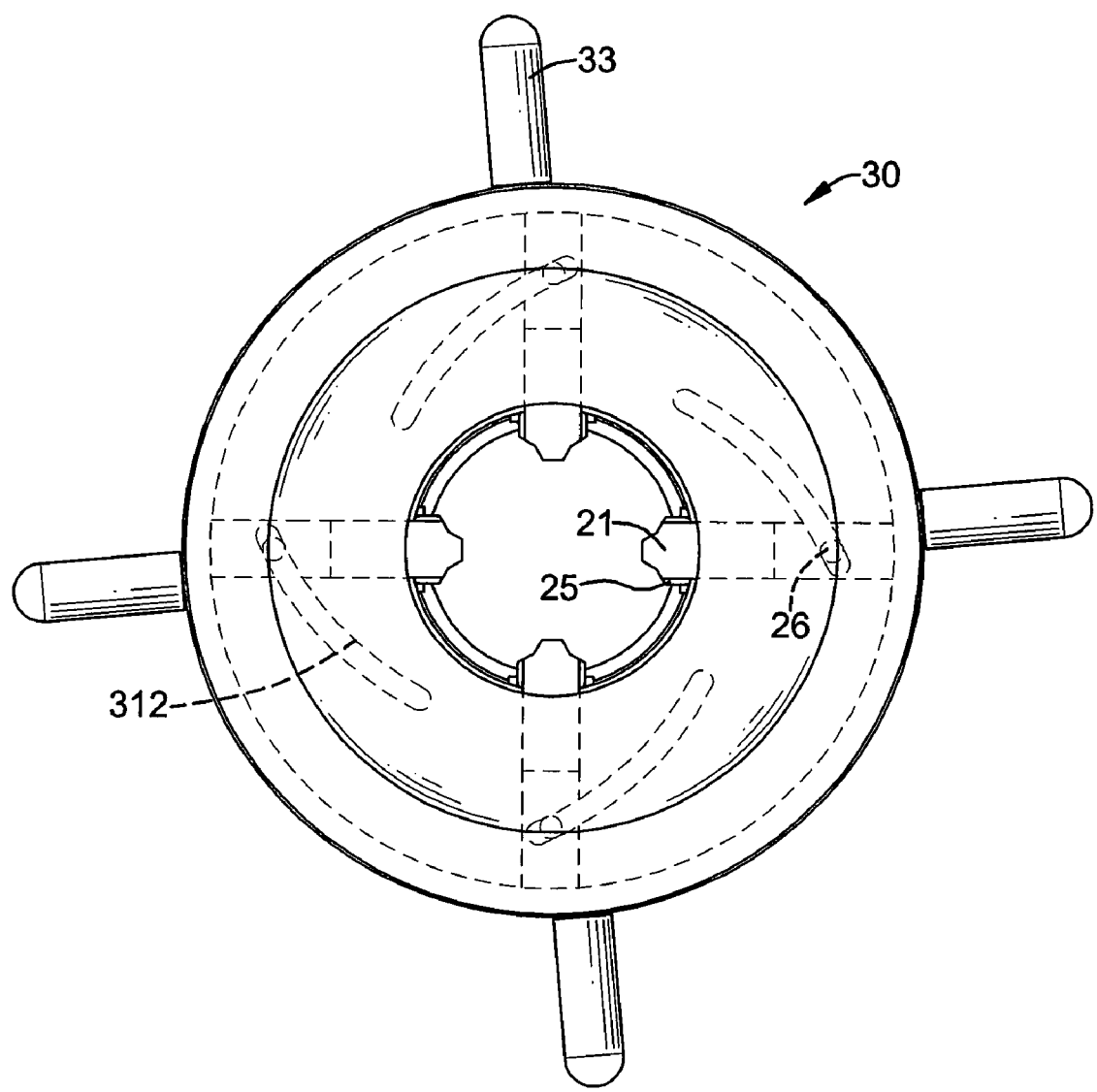
FIG. 4 is a top view of the adjustable magnetism shelter of the cutter holder in FIG. 1.
Figure 5:
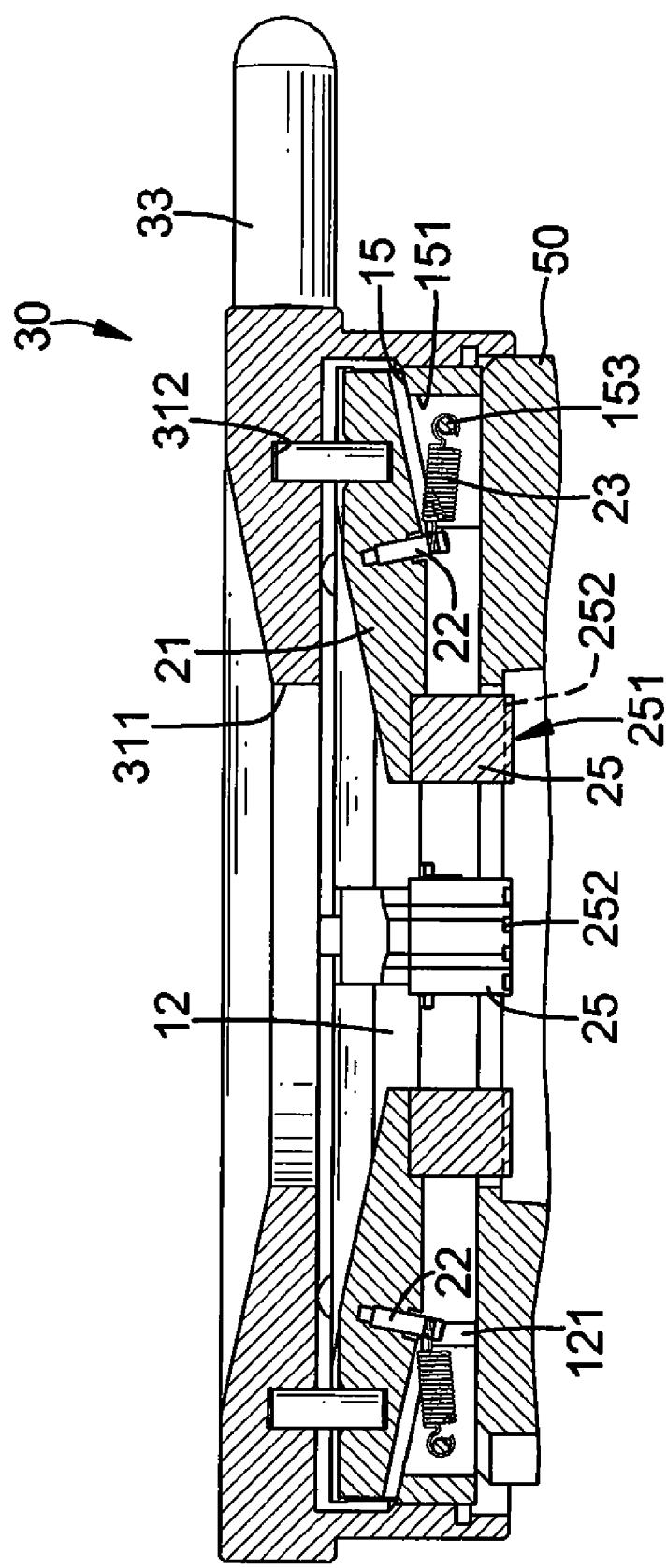
FIG. 5 is an enlarged side view in partial section of the adjustable magnetism shelter of the cutter holder in FIG. 1.

With reference to FIGS. 1 to 5, an adjustable magnetism shelter of a cutter holder in accordance with the present invention comprises a stationary collar (10), a sliding assembly (20), a cap (30) and a positioning element (40). The stationary collar (10) is annular and has a disk (11), a first hole (12), a second hole (121), a shoulder (122), multiple through holes (13), a positioning hole (14) and multiple sliding recesses (15). The disk (11) has a circular shape and has a center, a top surface, a bottom surface and a peripheral surface. The first hole (12) is circular, is defined in the top surface at the center of the disk (11) and has a bottom end and a diameter. The second hole (121) is formed in the bottom surface at the center of the disk (10), communicates with the first hole (12) and has a diameter. The diameter of the second hole (121) is larger than the diameter of the first hole (12) to form the shoulder (122) between the holes (12,121).

The multiple through holes (13) are defined separately around and through the top surface of the disk (11), are away from and kept from communicating with the second hole (121) and four through holes (13) may be implemented. The positioning hole (14) is defined in the peripheral surface of the disk (11). Each sliding recess (15) may be a dovetail recess or a T-shaped recess. The sliding recesses (15) are defined radially in the top surface of the disk (11) and around the first hole (12), four sliding recesses (15) may be implemented. Each sliding recess (15) has an inner end, an outer end, a bottom, a through groove (151), a pin hole (152) and a pin (153). The inner end of the sliding recess (15) faces to and communicates with the first hole (12) and the second hole (121). A width of the outer end is larger than that of the inner end of the sliding recess (15). The through groove (151) is defined in the bottom of the sliding recess (15), may be defined through the bottom surface of the disk (11) and has a first end and a second end. The first end of the through groove (151) communicates with the first and second holes (12,121). The second end of the through groove (15) is opposite to the first end of through groove (15). The pin hole (152) is defined in the peripheral surface of the disk (11) and has a middle. The middle of the pin hole (152) communicates with the second end of the through groove (151). The pin (153) is mounted in the pin hole (152) and mounted into and through the through groove (151).

The sliding assembly (20) comprises multiple sliding bars (21). Each sliding bar (21) may be T-shaped in cross section, and four sliding bars (21) may be implemented. Each sliding bar (21) is mounted slidably in a corresponding sliding recess (15) and has a first end, a second end, a top surface, a bottom surface, a concave groove (211), a stretch shaft (22), a stretch spring (23), a mounting shaft (24), a magnetism bar (25) and a moving shaft (26). The first end of each the sliding bar (21) protrudes into the first hole (12). The concave groove (211) is defined in the bottom surface of each the sliding bar (21) aligns with a corresponding through groove (151). The stretch shaft (22) is mounted on and protrudes from the bottom surface of each the sliding bar (21) and extends into a corresponding through groove (151) The stretch spring (23) is mounted in the corresponding through groove (151) and the concave groove (211) and has two ends connected respectively to a corresponding pin (153) and the stretch shaft (22). The mounting shaft (24) is mounted on and protrudes from the bottom surface (21) of the sliding bar (21) and abuts the second hole (121). The magnetism bar (25) is a sinter product formed by a process of powder metallurgy, provides a magnetization function and combined with the bottom surface at the first end of the sliding bar (21). Each magnetism bar (25) has a reflection surface (251). The reflection surface (251) may have a wave shape, a tine shape or a square wave shape, is opposite to the sliding bar (21) and has multiple flutes (252). The flutes (252) are separately defined longitudinally in the reflection surface (251). The moving shaft (26) is mounted on and protrudes from the top surface at the second end of each the sliding bar (21) and is opposite to the mounting shaft (24).

The cap (30) is annular, covers and is mounted on the stationary collar (10) and has top board (31), an annular flange (32) and multiple adjusting shafts (33). The top board (31) is annular and has a diameter, a bottom surface, a top hole (311), multiple arc grooves (312) and multiple shaft holes (322). The diameter of the top board (31) is larger than that of the disk (11). The top hole (311) is defined through the top board (31) of the cap (30) and is aligned with the first hole (12) of the stationary collar (10). The arc grooves (312) are separately defined in and around the bottom surface of the top board (31), and four arc grooves may be implemented. Each arc groove (312) has an inner end and an outer end. The inner end of the arc groove (312) is near the first hole (12). The outer end of the arc groove (312) is far away from the first hole (12) and receives one of the moving shafts (26) of the sliding assembly (20). The shaft holes (322) are separately defined through the top board (31) and four shaft holes (322) may be implemented.

The annular flange (32) is annular, protrudes from the bottom surface of the top board (31) and has multiple engaging holes (321). The engaging holes (321) may be five, are mounted separately through the annular flange (312) and are selectively aligned with the positioning hole (14). Each adjusting shaft (33) is screwed into and protrudes from one of the shaft holes (322).

The positioning element (40) comprises a positioning spring (41) and a positioning ball (42). The positioning spring (41) is mounted in the positioning hole (14). The positioning ball (42) is mounted in and protrudes from the positioning hole (14) and selectively engages one of the engaging holes (321).

Figure 6:
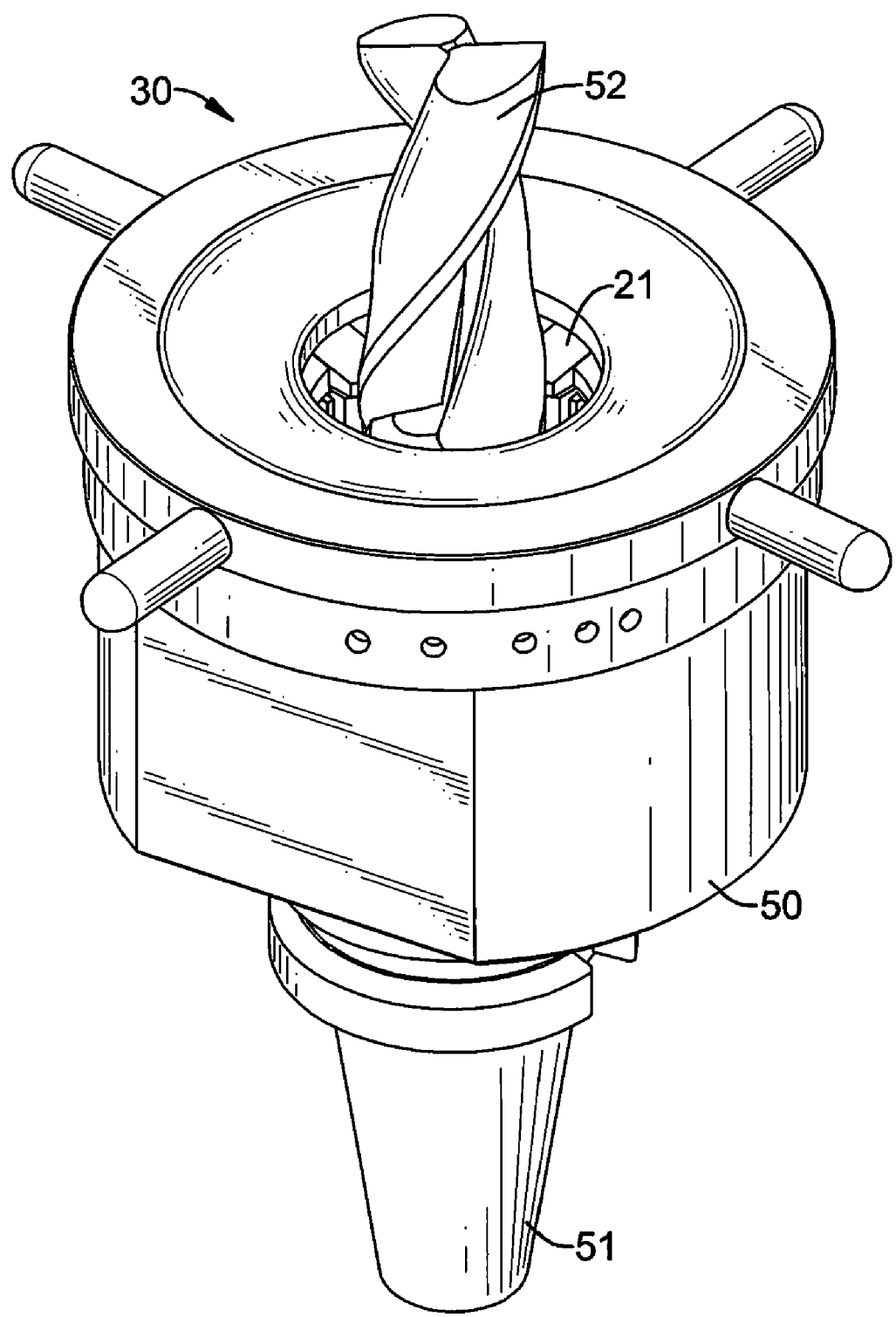
FIG. 6 is an operational perspective view of the adjustable magnetism shelter of the cutter holder in FIG. 1 combined with a cutter tool.
Figure 7:
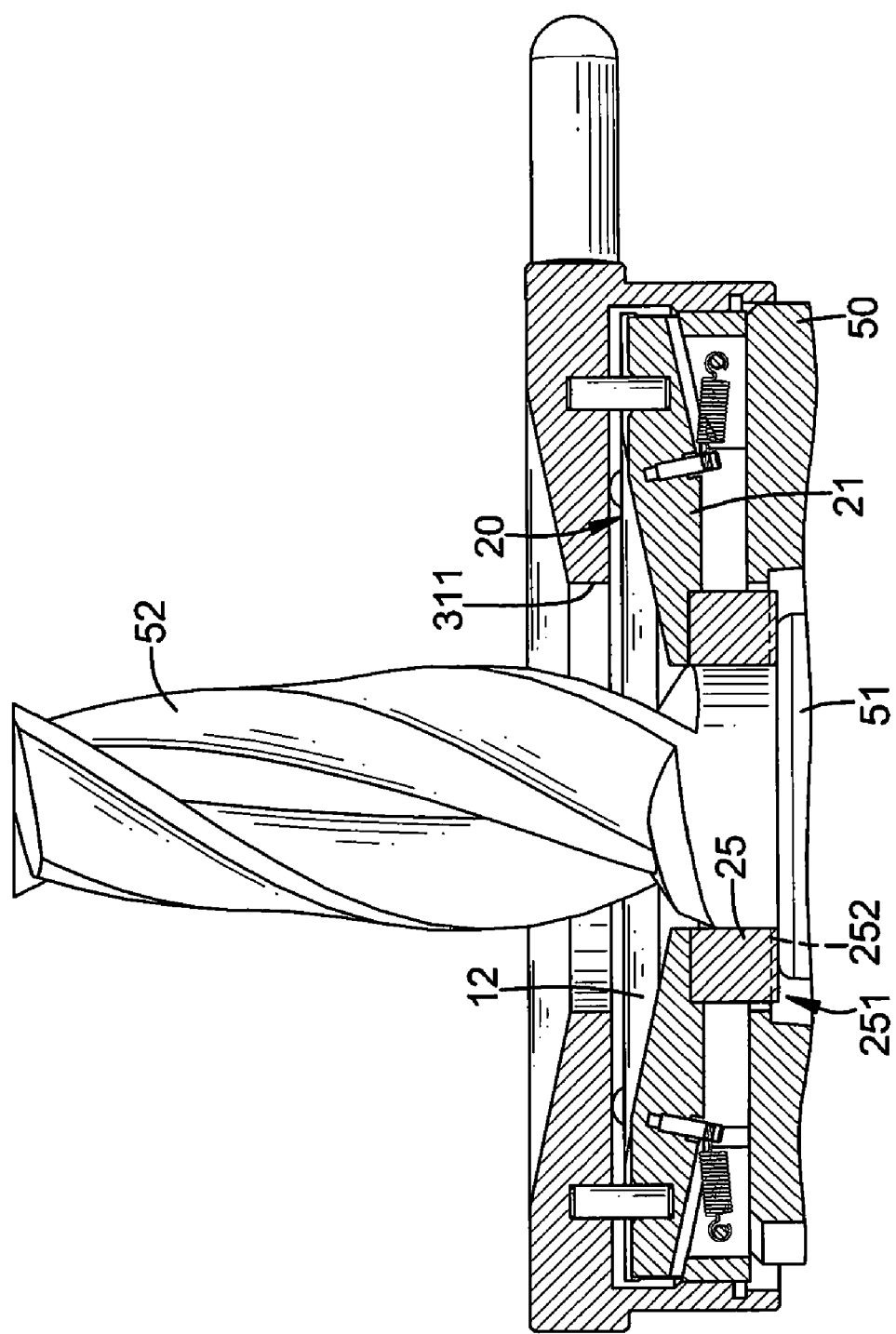
FIG. 7 is an enlarged operational side view in partial section of the adjustable magnetism shelter of the cutter holder in FIG. 6.
Figure 8:
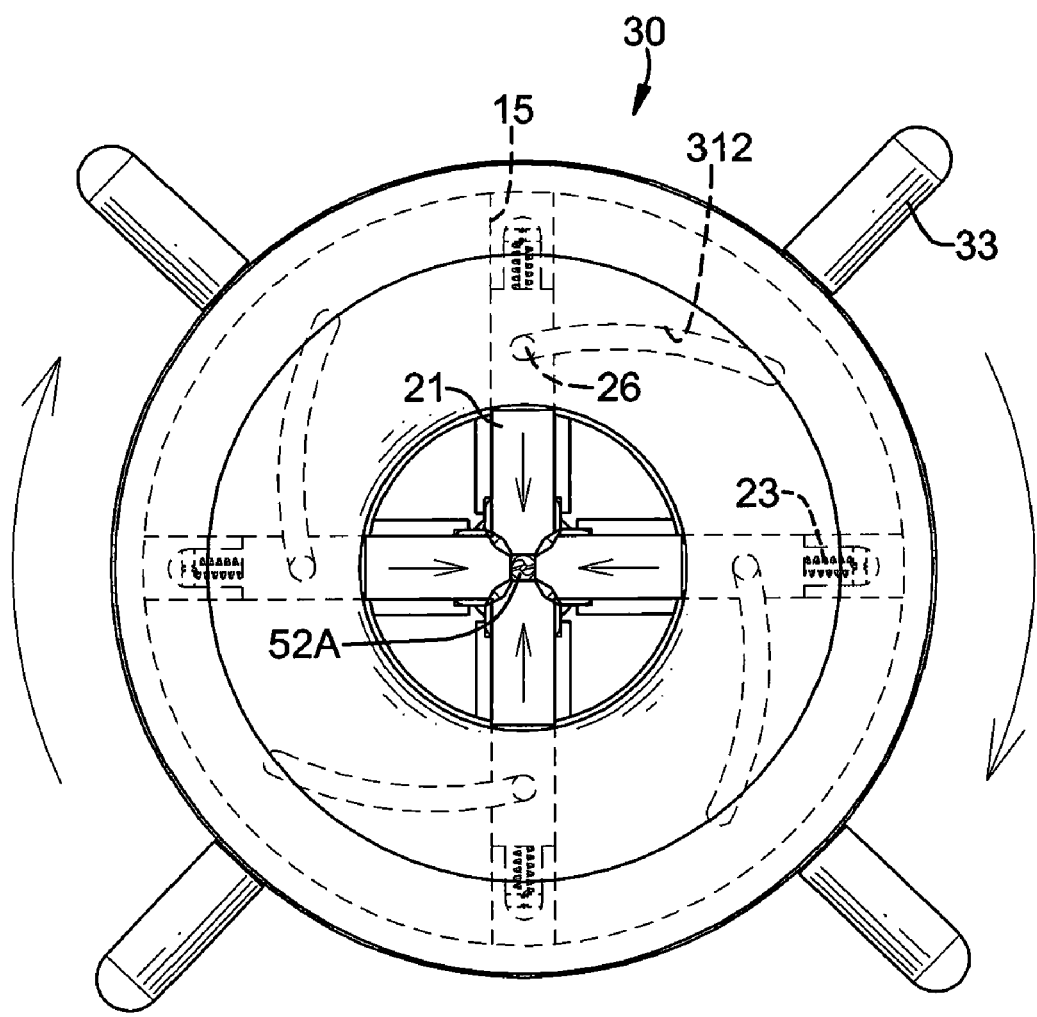
FIG. 8 is an enlarged operational top view of the adjustable magnetism shelter of the cutter holder in FIG. 1.
Figure 9:
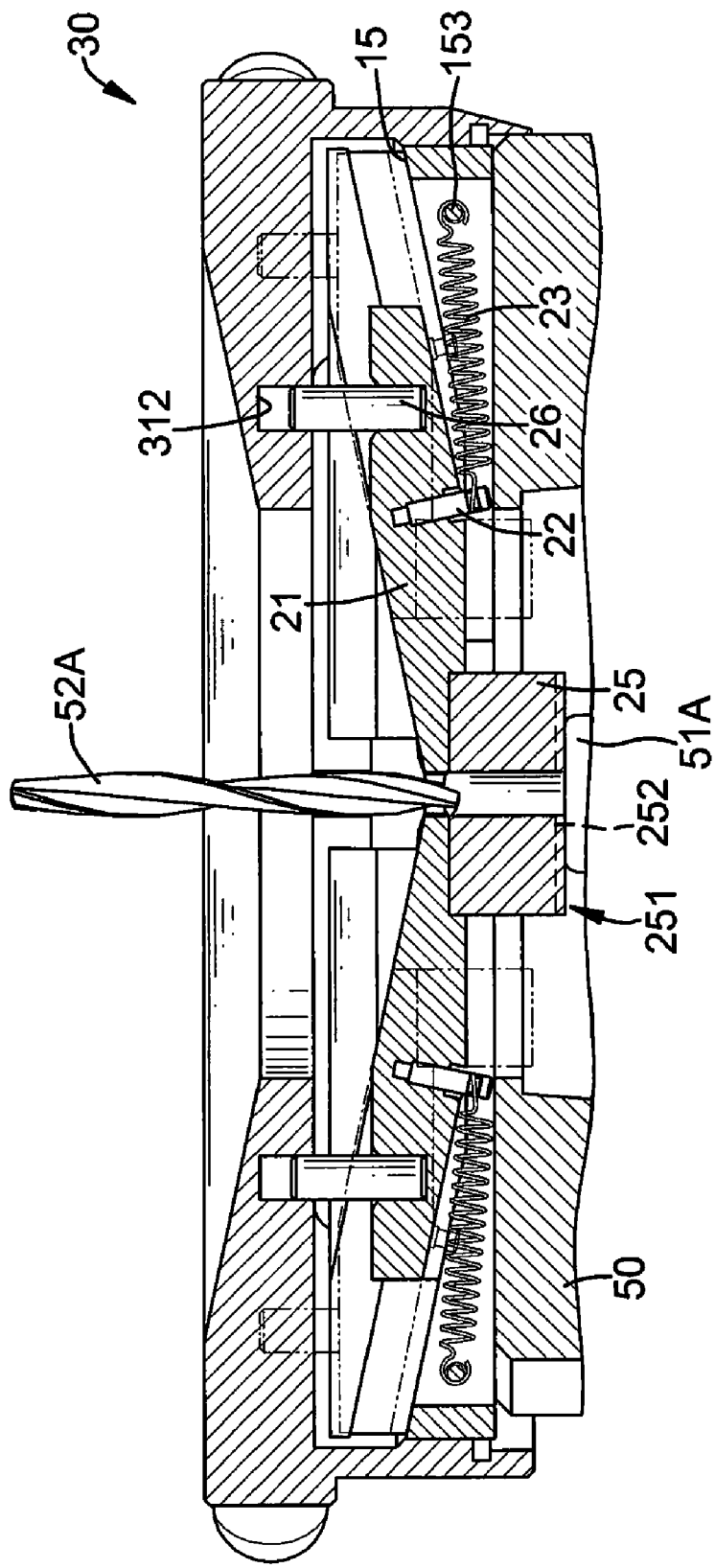
FIG. 9 is an operational side view in partial section of the adjustable magnetism shelter of the cutter holder in FIG. 1 combined with another cutter tool.

With reference to FIGS. 1, 2, and 5 to 9, when multiple bolts are mounted through the through holes (13) and screwed into threaded holes defined in a connecting surface of a heating devise (50), the stationary collar (10) is combined with the heating device (50). A cutter tool (52, 52A) is then inserted into a holding hole of a corresponding cutter holder (51,51A) that is held in the heating device (50), and one of the adjusting shafts (33) is pushed to rotate the cap (30) relative to the stationary collar (10). With the rotation of the cap (30), the moving shafts (26) are moved along the arc grooves (312) to make the sliding bars (21) slide respectively along the sliding recesses (15) and abut the cutter holder (51,51A). The positioning ball (42) will disengaged from one of the engaging holes (321) until the positioning ball (42) holds the cap (30) at a different position. At this time, the magnetism bars (25) are moved with the sliding bars (21) and abut around the cutter tool (52, 52A), so the magnetism bars (25) are located above and are mounted around a top of the cutter holder (51,51A).

When the heating device (50) is actuated a coil of the heating device (50) provides a magnetic line of force. Because the reflection surface (251) of the magnetism bar (25) provides a shelter to the magnetic line of force of the heating device (50), the magnetic line of force is reflection and focuses on the top of the cutter holder (51,51A). The magnetic line of force can induces heat in the cutter holder (51,51A), so the holding hole of the cutter holder (51,51A) is expanded to allow the cutter tool (52, 52A) to be drawn out easily. To push one of the adjusting shafts (33) reversely, the sliding bars (21) are sliding away from the cutter tool (52, 52A) easily by the stretch springs (23). Consequently, the magnetism bars (25) can shelter and reflect the magnetic line of force of the heating device (50) completely to enhance an efficiency of a thermal energy transformation.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable magnetism shelter of a cutter holder comprising:
   a stationary collar having
      a disk having
         a center; and
         a top surface;
      a first hole defined in the top surface at the center of the disk;
      multiple sliding recesses defined radially in and defined the top surface of the disk and around the first hole;
   a sliding assembly having
      multiple sliding bars separately mounted slidably in the sliding recesses and having
         a second end; and
         a magnetism bar having a reflection surface having a wave shape and disposed opposite to a corresponding sliding bar;
      a moving shaft mounted on and protruding from the second end of the sliding bar; and
   a cap covering and mounted on the stationary collar and having
      a top board having
         a bottom surface;
         a top hole defined through the top board, aligned with the first hole of the stationary collar;
         multiple arc grooves separately defined in and defined around the bottom surface of the top board and each arc groove having
            an inner end of the arc groove being near the first hole; and
            an outer end of the arc groove being far away from the first hole and inserted by one of the moving shafts of the sliding assembly.

2. The adjusting magnetism shelter of a cutter holder as claimed in claim 1, wherein the disk has a circular shape and further has
- a bottom surface opposite to the top surface; and
- the first hole is circular and has
  - a bottom end;
  - a diameter;
- the stationary collar has
  - a second hole formed in the bottom surface, communicating with the first hole and having
    - a diameter larger than the diameter of the first hole;
  - a shoulder formed between the first hole and the second hole; and
- each sliding recess has
  - an inner end facing to and communicating with the first hole and having
    - a width;
  - an outer end having a width larger than the width of the inner end and disposed opposite to the inner end; and
- the reflection surface has multiple flutes separately defined longitudinally in the reflection surface.

3. The adjusting magnetism shelter of a cutter holder as claimed in claim 2, wherein the disk further has a peripheral surface; and
- each sliding recess has
  - a bottom;
  - a through groove is defined in the bottom of each sliding recess;
  - a pin mounted in the peripheral surface of disk, mounted into the through groove;
  - each sliding bar further has a bottom surface; and
  - a concave groove defined in the bottom surface of the sliding bars disposed above and aligning with a corresponding through groove; and
- the sliding assembly further comprises
  - a stretch shaft mounted on and protruding from the bottom surface of the sliding bar and extending into the corresponding through groove;
  - a stretch spring connected with a corresponding pin and the stretch shaft, mounted in the corresponding through groove and the concave groove; and
- the sliding bars further have a mounting shaft protruding from the bottom surface of the sliding bar and abutting the second hole.

4. The adjusting magnetism shelter of a cutter holder as claimed in claim 2, wherein the stationary collar further has a positioning hole defined in a peripheral surface of the disk; and
- the cap is annular and further has an annular flange protruding from the bottom surface of the top board and having
  - multiple engaging holes mounted separately through the annular flange and selectively aligning with the positioning hole;
- wherein the adjusting magnetism shelter further has a positioning element having
  - a positioning spring mounted in the positioning hole; and
  - a positioning ball mounted in and protruding from the positioning hole and mounted in one of the engaging holes.

5. The adjusting magnetism shelter of a cutter holder as claimed in claim 3, wherein the stationary collar further has a positioning hole defined in the peripheral surface of the disk; and
- the cap is circular and further has an annular flange protruding from the bottom surface of the top board and having
  - multiple engaging holes mounted separately through the annular flange, aligning with the positioning hole;
- wherein the adjusting magnetism shelter further has a positioning element having
  - a positioning spring mounted in the positioning hole; and
  - a positioning ball mounted in and protruding from the positioning hole and selectively engages one of the engaging holes.

6. The adjusting magnetism shelter of a cutter holder as claimed in claim 4, wherein the disk has four sliding recesses; and
- the top board has four arc grooves; and
- the annular flange has four shaft holes; and
- four adjusting shafts are screwed into and protrude from one of the shaft holes.

7. The adjusting magnetism shelter of a cutter holder as claimed in claim 5, wherein the disk has four sliding recesses; and
- the top board has four arc grooves; and
- the annular flange has four shaft holes; and
- four adjusting shafts protrude from and are screwed into one of the shaft holes.

8. The adjusting magnetism shelter of a cutter holder as claimed in claim 7, wherein each sliding recess is T-shaped in cross section.

* * * * *